US011305458B2

(12) United States Patent  
Kyttanen

(10) Patent No.: US 11,305,458 B2  
(45) Date of Patent: Apr. 19, 2022

(54) PROCESS FOR PRODUCING A CURED 3D PRODUCT

(71) Applicant: WHAT THE FUTURE VENTURE CAPITAL (WTFVC) B.V., Amsterdam (NL)

(72) Inventor: Janne Tuomas Kyttanen, West Hollywood, CA (US)

(73) Assignee: WHAT THE FUTURE VENTURE CAPITAL (WTFVC) B.V.

( * ) Notice: Subject to any disclaimer, the term of this patent is extended or adjusted under 35 U.S.C. 154(b) by 196 days.

(21) Appl. No.: 16/712,275

(22) Filed: Dec. 12, 2019

(65) Prior Publication Data

US 2020/0189146 A1 Jun. 18, 2020

Related U.S. Application Data

(60) Provisional application No. 62/780,438, filed on Dec. 17, 2018.

(51) Int. Cl.
*C08F 12/08* (2006.01)
*C04B 35/622* (2006.01)
(Continued)

(52) U.S. Cl.
CPC .............. *B28B 7/0029* (2013.01); *B28B 1/30* (2013.01); *B28B 11/24* (2013.01); *B29C 51/00* (2013.01);
(Continued)

(58) Field of Classification Search
CPC .................................................... B29C 51/105
See application file for complete search history.

(56) References Cited

U.S. PATENT DOCUMENTS 4,767,479 A 8/1988 Ferguson et al.
4,837,187 A 6/1989 Frank et al.
(Continued)

FOREIGN PATENT DOCUMENTS

CN 102715751 A 10/2012
CN 106397824 A 2/2017
(Continued)

OTHER PUBLICATIONS

"Thermoforming." Wikipedia, Wikimedia Foundation, Dec. 12, 2018, web.archive.org/web/20181212151939/en.wikipedia.org/wiki/Thermoforming. (Year: 2018).*
(Continued)

*Primary Examiner* — Kelly M Gambetta
*Assistant Examiner* — Andrés E. Behrens, Jr.
(74) *Attorney, Agent, or Firm* — Gardner Groff & Greenwald, PC

(57) ABSTRACT

The invention is directed to a process for producing a cured 3D product comprising the following steps: (a) providing a form negative mould of the 3D product comprising of one or two formed plastic sheets as obtained by thermoforming corresponding with the shape of the 3D product; (b) adding a liquid curable composition to the mould such that the inner surface of the mould is covered by the curable composition; and (c) solidifying the curable composition wherein a solidified layer or body is formed having the shape of the 3D product; wherein the cured 3D product is a radiation cured 3D product; and wherein the step (c) a radiation curable composition is solidified by radiation through the plastic sheet of the mould to form a solidified layer having the shape of the 3D product.

12 Claims, 2 Drawing Sheets

Figure 1:
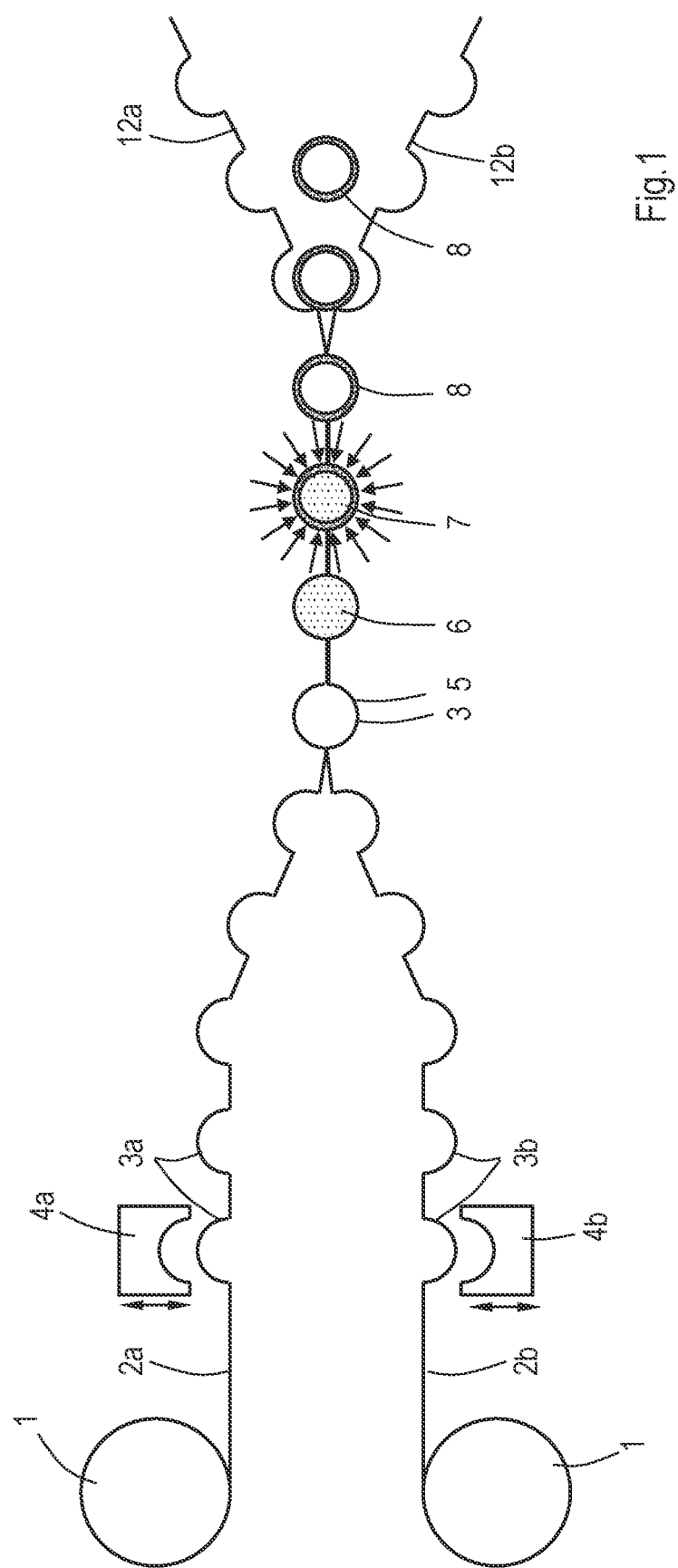

(51) Int. Cl.
| | | |
|---|---|---|
| B28B 11/24 | (2006.01) | |
| B28B 1/30 | (2006.01) | |
| B29C 51/00 | (2006.01) | |
| B28B 7/00 | (2006.01) | |
| B29C 51/10 | (2006.01) | |
| B29C 51/30 | (2006.01) | |
| B28B 7/34 | (2006.01) | |
| C04B 35/00 | (2006.01) | |
| C04B 35/66 | (2006.01) | |
| B28B 11/00 | (2006.01) | |
| B28B 1/00 | (2006.01) | |
| B29C 51/02 | (2006.01) | |
| B29K 25/00 | (2006.01) | |

(52) U.S. Cl.
CPC .......... B29C 51/002 (2013.01); B29C 51/105 (2013.01); B29C 51/30 (2013.01); C04B 35/622 (2013.01); C08F 12/08 (2013.01); B29K 2025/06 (2013.01); C04B 2235/602 (2013.01); C04B 2235/667 (2013.01)

(56) References Cited

U.S. PATENT DOCUMENTS

| | | | |
|---|---|---|---|
| 5,017,461 A | 5/1991 | Abe | |
| 5,273,104 A | 12/1993 | Renaud et al. | |
| 5,374,500 A | 12/1994 | Carpenter, Jr. et al. | |
| 5,885,514 A * | 3/1999 | Tensor | B29C 35/0888 264/478 |
| 6,117,612 A | 9/2000 | Halloran et al. | |
| 6,586,494 B2 | 7/2003 | Mejiritski et al. | |
| 6,637,500 B2 | 10/2003 | Shah et al. | |
| 6,692,891 B2 | 2/2004 | Jung et al. | |
| 6,932,145 B2 | 8/2005 | Frasier et al. | |
| 6,932,930 B2 | 8/2005 | DeSimone et al. | |
| 6,939,940 B2 | 9/2005 | Dingemans et al. | |
| 7,507,784 B2 | 3/2009 | Dingemans et al. | |
| 7,534,844 B2 | 5/2009 | Lee et al. | |
| 7,550,246 B2 | 6/2009 | Fukuzumi et al. | |
| 7,649,029 B2 | 1/2010 | Kolb et al. | |
| 7,767,728 B2 | 8/2010 | Lu et al. | |
| 7,824,839 B2 | 11/2010 | Ober et al. | |
| 7,919,162 B2 | 4/2011 | DeSimone et al. | |
| 7,935,476 B2 | 5/2011 | Teng | |
| 8,232,043 B2 | 7/2012 | Williamson et al. | |
| 8,500,898 B2 | 8/2013 | Raunig et al. | |
| 8,550,144 B2 | 10/2013 | Frasier et al. | |
| 10,821,498 B2 * | 11/2020 | Kyttanen | B22C 9/04 |
| 2004/0239008 A1 * | 12/2004 | Gottlieb | B29C 45/14336 264/494 |
| 2010/0003619 A1 | 1/2010 | Das et al. | |
| 2015/0266249 A1 * | 9/2015 | Booth | B29D 99/0028 416/229 R |
| 2015/0366073 A1 | 12/2015 | Magdassi et al. | |
| 2018/0304499 A1 * | 10/2018 | Constantinou | B29C 35/0888 |
| 2018/0326480 A1 | 11/2018 | Opschoor et al. | |
| 2021/0206047 A1 * | 7/2021 | Albertelli | B29C 33/405 |

FOREIGN PATENT DOCUMENTS

| | | |
|---|---|---|
| DE | 2407827 A1 | 9/1975 |
| JP | S5946035 A | 3/1984 |
| JP | 2012196876 A | 10/2012 |
| JP | 2012210408 A | 11/2012 |
| WO | 2012129968 A1 | 10/2012 |
| WO | 2012170008 A1 | 12/2012 |
| WO | 2019009714 A1 | 1/2019 |

OTHER PUBLICATIONS

Santos, Vinicius J. "Influence of Dispersion Process on the Characteristics of PVP-Clay Hydrogel." Instituto De Pesquisas Energéticas E Nucleares, Brazilian Conference on Composite Materials, Apr. 31, 2013, repositorio.ipen.br/bitstream/handle/123456789/27352/23972.pdf?sequence=1&isAllowed=y. (Year: 2013).*

Berg, John. "Mold Cleaning Done Right Takes a Systematic Approach." MoldMaking Technology, Oct. 1, 2013, www.moldmakingtechnology.com/articles/mold-cleaning-done-right-takes-a-systematic-approach. (Year: 2013).*

Costa, Luís Cadillon, et al. "Dielectric Characterisation of Plastics for Microwave Oven Applications." Materials Science Forum, vol. 480-481, 2005, pp. 161-164., doi:10.4028/www.scientific.net/msf.480-481.161. (Year: 2005).*

Sudiana, I Nyoman. "High Frequency Microwave Sintering of Alumina Ceramics ." Universitas Halu Oleo, Department of Physics, Faculty of Mathematic and Natural Science, 2015, karyailmiah.uho.ac.id/karya_ilmiah/Ngkoimani/30.High_Frequency.pdf. (Year: 2015).*

Helmke, Rob. "Common Plastics for Thermoforming." Plastic Ingenuity, Apr. 8, 2014, www.plasticingenuity.com/blog/common-plastics-for-thermoforming. (Year: 2014).*

Argawal, Dinesh. Microwave Sintering of Ceramics, Microwave Processing and Engineering Center, Aug. 2006. (Year: 2006).*

"Thermoforming and Vacuum Forming Design for Manufacturing." Online 3D Printing Service | Fast & Affordable | FDM, MJF, SLS +, www.rapidmade.com/thermoforming-design-for-manufacturing. (Year: 2017).*

"What Are the Best Solvents for Cleaning Uncured Materials from Different Surfaces?" Smooth, 2017, www.smooth-on.com/support/faq/118/. (Year: 2017).*

Search Report and Written Opinion for NL2022372; dated Oct. 15, 2019; 9 pgs.

* cited by examiner

PROCESS FOR PRODUCING A CURED 3D PRODUCT

This application claims the benefit of U.S. Provisional Patent Application Ser. No. 62/780,438 filed Dec. 17, 2018, the entirety of which is hereby incorporated herein by reference for all purposes.

The invention is directed to a process for producing a cured 3D product.

Radiation cured 3D products can be produced by additive manufacturing (AM) (or also referred to as stereolithography) for example described in U.S. Pat. No. 6,586,494. In such a process a container is provided with a curable resin (RCR). The flat bottom of the container is typically made of a transparent material that allows the resin curing radiation to be transmitted through the bottom and interact with a radiation-curable resin layer adjacent to the bottom of the container. The transmitted through the bottom curing radiation interacts/cures a thin, adjacent to the bottom, layer of resin, typically 10-100 um thick. Once a layer of resin is cured the entire manufactured 3D object is lifted, typically 10-100 um above the bottom of the container, allowing to cure another layer of radiation-curable resin forming the object. This way the object is built a layer after a layer until the entire object is produced above the bottom of the container. Additive manufacturing (AM) devices where a layer of radiation-curable resin is deposited on the top of an earlier deposited layer are also known and described for example, in Also ceramic 3D products may be made by additive manufacturing wherein layers of a photocurable ceramic dispersion form a 3D printed product. The polymerised resin may be removed from the so-called 3D printed product in a sintering step and a ceramic product is obtained.

Additive manufacturing (AM) is a favoured process to make 3D products when only a small number of products are desired. When one desires to manufacture numerous identical products on a large scale additive manufacturing is typically not used because a too high number of AM or 3D printing stations would be required to achieve the desired production capacity.

Ceramic products can be processed in large numbers using processes which have been known for thousands of years. In a traditional method a plaster mould is filled with clay. While rotation the plaster mould a layer of clay is formed at the interior of the mould. The resulting 3D intermediate 3D product is removed from the mould and subsequently bisque fired to obtain a bisque product. Glazing may be added to the bisque product in a glazing oven. A disadvantage of this manufacturing method is that it involves numerous manual handling steps. When a large production capacity is required the number of plaster moulds is increased, which further enhances the amount of manual handling.

The object of the invention is to provide an efficient process to make numerous identical 3D products in a high production capacity and which require less manual handling.

This is achieved by the following process. Process for producing a cured 3D product comprising the following steps:
(a) providing a form negative mould of the 3D product comprising of one or two formed plastic sheets as obtained by thermoforming corresponding with the shape of the 3D product,
(b) adding a liquid curable composition to the mould such that the inner surface of the mould is covered by the curable composition, and
(c) solidifying the curable composition wherein a solidified layer or body is formed having the shape of the 3D product wherein the cured 3D product is a radiation cured 3D product and wherein the step (c) a radiation curable composition is solidified by radiation through the plastic sheet of the mould to form a solidified layer having the shape of the 3D product.

Applicants found that with the invented process numerous identical 3D products may be manufactured in a simple manner. The moulds may be manufactured in high numbers by thermoforming applying well known technologies from the packaging industry. The costs per mould is very low enabling the use of a single mould for the manufacture of one 3D product only. This single use of the mould enables one to destructively separate the mould from the solid product thereby simplifying the process. Alternatively the process enables one to cure the 3D product within its own packaging by radiation through said packaging material. The mould is used as packaging of the 3D product obtained within said packaging, thereby simplifying the process of manufacture and packaging. The process is further advantageous because it enables an easy switch in the shape of products manufactured by this process. By simply using a different thermoforming master mould one is able to quickly change the shape of the 3D product while being able to use the same production facility. In a traditional method for ceramic products such a change would require the manufacture of a master mould and numerous plaster moulds based on the master mould. In the process according to the invention only the thermoforming master mould has to be provided to enable the manufacture of a new 3D product. The invention will be described in more detail below In step (a) a form negative mould of the 3D product comprising of a plastic sheet is provided. The mould may comprise of only one formed plastic sheet leaving an open side. When the liquid curable composition is added in step (b) it is preferably added from above while the formed end of the mould faces downwards. In this way the liquid curable composition remains within the mould. Such a mould may be suitably used to make tiles and other products having a single facing side.

The mould may also be comprised of one formed plastic sheet and one planar sheet covering and connected to the shaped plastic sheet to create a hollow space at its inner side. Preferably the mould comprises two interconnected formed plastic sheets creating a hollow space within its inner side. The hollow space corresponds with the shape of the 3D product. In step (b) a liquid curable composition is added to this hollow space. For allowing the liquid curable composition to flow to the hollow space corresponding to the 3D product it is preferred that the plastic sheet further defines a gating system. This gating system fluidly connects an opening into which the liquid curable composition may be added to the hollow spaces corresponding to the 3D product.

The formed plastic sheets are obtained by thermoforming. Thermoforming is a manufacturing process where a plastic sheet is heated to a pliable forming temperature and formed to a specific shape in a master mould. The sheet is heated to a high-enough temperature that permits it to be stretched into or onto a mould and cooled to a finished shape. When the mould comprises two formed plastic sheets it may be preferred that these are simultaneously manufactured by thermoforming and subsequently interconnected making use of a manufacturing processes as here described.

The plastic sheet may be any type of plastic and especially plastics suitable for thermoforming. The plastic sheet should not be an obstruction for the radiation and preferably does not absorb any significant part of the radiation as it travels through the plastic sheet. For this reason light transparent sheets are preferably used when the radiation is visible light or ultra-violet radiation. When the radiation is for example microwave it is preferred to used plastic sheets which do which could cause dielectric heating of the plastic sheet itself. The material for the plastic sheet is preferably strong at a minimum sheet thickness. The plastic is suitably a thermoplastic polymer. Examples of suitable thermoplastic polymers are polyethylene, polypropylene, polycarbonate and preferably polystyrene. The thickness of the sheet may vary from 50 microns to even 5 mm, wherein the lower part of the range may be used to make smaller products and the upper end of the range may be used to make larger products. For example, for making products having a maximum dimension of less than 50 cm the thickness of the sheet may vary between 50 and 200 microns.

The master mould used in the thermoforming process may be obtained by 3D printing or machined making use of for example computer numerical control. Preferably the master mould is obtained by 3D printing because this enables one to manufacture different designs without having to make master mould using laborious techniques like machining. A number of 3-D printing technologies will be available to the skilled addressee, printing in a range of materials including plaster (e.g. with the 3-D printer sold under the Registered Trademark "ProJet® 660 Pro" by 3D systems Inc., USA), thermoplastics, photopolymerised polymers, or thermally-sintered materials.

When the master mould is made by 3D printing using a material having a low thermal conductivity as described above it is preferred that the master mould is provided with a number of openings which fluidly connect the side of the master mould facing the form negative mould of the 3D product and its opposite side. The thickness of the master mould is preferably between 0.5 and 5 mm. The holes are typically less than 2 mm in diameter, and preferably less than 1 mm in diameter. The openings allow air to escape through the master mould during the forming process. The master mould is further suitably provided with channels for passage of cooling air. Cooling of the master mould enhances the produced form negative mould of the 3D product to solidify into its desired shape in the master mould.

Thermoforming is suitably performed using a thermoforming packaging machine in a continuous process. Such Thermoforming packaging machines are well known. Such machines enables one to prepare numerous moulds in a continuous process starting from a roll of sheet or from an extruder providing a sheet. Such a thermoforming packaging machine may comprise of one or two thermoforming stations, a sealing station and a cutting station. Preferably the thermoforming packaging machine comprises of one or two thermoforming stations, a sealing station and a cutting station and wherein the in a thermoforming station a formed intermediate sheet is obtained, wherein in the sealing station this formed intermediate sheet is combined with a planar sheet or with another formed intermediate sheet obtained in the optional second thermoforming station to obtained connected form negative moulds of the 3D product and wherein in the cutting station the form negative moulds of the 3D product are cut from the connected form negative moulds of the 3D product.

A cutting station may also be omitted. Step (b) and (c) will then be performed using interconnected moulds. Such a strip of interconnected moulds may be processed in a production line wherein steps (b) and (c) are performed in different processing stations and wherein the strip of moulds runs from the sealing station to a station to perform step (b) and subsequently to a station to perform step (c).

In step (b) a liquid curable composition is added to the mould such that the inner surface of the mould is covered by the liquid curable composition. The inner side may be the inner surface of a single formed plastic sheet forming the mould. The inner side may also be the inner side of a hollow space formed by two formed plastic sheets or a combination of a planar sheet and a formed plastic sheet. In case of a hollow space it may be preferred to fill the space with the liquid curable composition. In this way a liquid layer of the composition will be present at the inner surface of the mould. When in step (c) the composition solidifies the thus obtained product will have taken the shape of the mould and thus of the desired 3D product. Any remaining liquid composition which has not solidified may be removed from the mould after step (c).

Adding the liquid curable composition may be performed by pouring the composition into the mould. Pouring may be performed by adding the composition from above into the mould, for example into an open upper end of a simple one sheet mould or via a gating opening or system when the mould comprises a hollow space. It may also be advantageous to add the composition via a gating system at the lower end of the mould. This allows the non-reacted or non-solidified composition to easily flow from the mould after performed in step (c). Some means to avoid that the composition flows from the mould after adding the composition will then be required. This may be achieved by valves or by maintaining some excess pressure on the dispersion via the gating system avoiding the composition to flow away from the mould.

In step (c) all or part of the liquid radiation curable composition as present within the mould is solidified by radiation through the plastic sheet of the mould. This results in that a solidified layer is formed having the shape of the 3D product. The wavelength of the radiation will depend on the choice of radiation curable composition. Many radiation curable compositions require light in the UV waveband, but some radiation curable compositions cure when visible light is used. Alternatively the radiation may be electromagnetic radiation, for example microwave, radio waves, ultra-sound or infrared. Preferably microwave radiation is used resulting in that the composition cures due to dielectric heating. Such a process is for example described in CN106397824 which describes the formation of a melamine-formaldehyde resin foam using microwave. When for example visible light or UV light is used a suitable light source may be used which radiates the outer surface of the mould, preferably in a more or less uniform manner. If different thickness in the solidified layer is desired more or less radiation may be applied on the outer surface of the mould. The more or less radiation may be expressed in intensity and/or in the duration of the radiation. In step (c) the time the mould is subjected to radiation may be significantly longer than when such a dispersion is used in stereolithography. Preferably a higher content of photo initiator compounds are present in the composition to accommodate the added radiation. In step (c) it may even be preferable that the polymerisation continues even in the absence of radiation. This continuous polymerisation would be beneficial for obtaining a thicker solidified layer. Thus radiation curable compositions with a high propagation rate may be preferred when thicker solidified layers or even entirely solid 3D products are desired.

The radiation in step (c) may be performed in a continuous process wherein the moulds, suitably interconnected as described above, continuously enter a curing station, or preferably a radiation station, where the outer surface is radiated with a chosen intensity and duration, and wherein the radiated moulds are continuously discharged from the station.

The radiation curable composition added in step (b) may be any liquid radiation curable composition which under the influence of radiation cures to obtain a solid 3D product. Compositions known for performing stereolithography are examples of suitable compositions. Such compositions are also referred to as "liquid resin" "ink," or simply "resin". But also other compositions which for example cure under the influence of microwave radiation may also be used. The curable compositions suitably comprise of a monomer, particularly photopolymerizable and/or free radical polymerizable monomers and a suitable initiator such as a free radical initiator. Examples of suitable monomers are acrylics, methacrylics, acrylamides, epoxydes, styrenics, olefins, halogenated olefins, cyclic alkenes, maleic anhydride, alkenes, alkynes, carbon monoxide, functionalized oligomers, multifunctional cute site monomers and functionalized PEGs. Examples of such liquid curable compositions illustrating possible combinations of monomers and initiators are described in U.S. Pat. Nos. 6,586,494, 8,232,043, 8,119,214, 7,935,476, 7,767,728, 7,649,029, WO2012129968, CN102715751 and JP2012210408.

Examples of a class of suitable radiation curable composition are acid catalyzed polymerizable liquids. The acid catalyzed polymerizable liquid suitably comprises monomers containing groups suitable for acid catalysis, such as epoxide groups, vinyl ether groups, etc. Thus, suitable monomers include olefins such as methoxyethene, 4-methoxystyrene, styrene, 2-methylprop-1-ene, 1,3-butadiene, etc.; heterocyclic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839, 7,550,246, 7,534,844, 6,692,891, 5,374,500, and 5,017,461, see also Photoacid Generator Selection Guide for the electronics industry and energy curable coatings (BASF 2010).

Another class of suitable radiation curable compositions are hydrogels. Examples of suitable hydrogels are poly(ethylene glycols) (PEG) and gelatins. PEG hydrogels may be used to deliver a variety of biologicals, including growth factors. UV or visible light can be used to crosslink appropriately modified gelatin. Methods for crosslinking gelatin include cure derivatives from dyes such as Rose Bengal.

Another class of suitable radiation curable compositions are photocurable silicone resins. A suitable resin includes photocurable silicones. UV cure silicone rubber, such as Siliopren™ UV Cure Silicone Rubber can be used as can LOCTITE™ Cure Silicone adhesives sealants. Cured 3D products such as optical instruments, medical and surgical equipment, exterior lighting and enclosures, electrical connectors/sensors, fiber optics and gaskets may be produced.

Another class of suitable radiation curable compositions are biodegradable resins. Biodegradable resins are particularly important for implantable devices to deliver drugs or for temporary performance applications, like biodegradable screws and stents as for example described in U.S. Pat. Nos. 7,919,162 and 6,932,930. Biodegradable copolymers of lactic acid and glycolic acid (PLGA) can be dissolved in PEG di(meth)acrylate to yield a transparent resin suitable for use. Polycaprolactone and PLGA oligomers can be functionalized with acrylic or methacrylic groups to allow them to be effective resins for use.

Another class of suitable radiation curable compositions are photocurable polyurethanes. A particularly useful resin is photocurable polyurethanes (including polyureas, and copolymers of polyurethanes and polyureas (e.g., poly(urethane-urea)). A photopolymerizable polyurethane/polyurea composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material as described in U.S. Pat. No. 4,337,130. Photocurable thermoplastic polyurethane elastomers incorporate photoreactive diacetylene diols as chain extenders.

Another class of suitable radiation curable compositions are high performance resins. Such high performance resins may sometimes require the use of heating to melt and/or reduce the viscosity thereof before being able to be poured into the mould. Examples of such resins include, but are not limited to, resins for those materials sometimes referred to as liquid crystalline polymers of esters, ester-imide, and ester-amide oligomers, as described in U.S. Pat. Nos. 7,507,784 and 6,939,940. Since such resins are sometimes employed as high-temperature thermoset resins, in the present invention they further comprise a suitable photoinitiator such as benzophenone, anthraquinone, and fluoroenone initiators (including derivatives thereof), to initiate cross-linking on radiation, as discussed further below.

Additional example resins. Particularly useful resins for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM1401V High Temperature Mold Material for use directly with vulcanized rubber in molding/casting applications. A particularly useful material for making tough and stiff parts includes EnvisionTEC's RC31 resin. Particularly useful resin for investment casting applications include EnvisionTEC's Easy Cast EC500 resin and MadeSolid FireCast resin.

The liquid radiation curable composition may have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size. Two specific examples will be described below in more detail.

The liquid curable composition can have additional ingredients solubilized therein, including pigments, dyes, active compounds or pharmaceutical compounds, detectable compounds {e.g., fluorescent, phosphorescent, radioactive), etc., again depending upon the particular purpose of the product being fabricated.

Preferably the liquid radiation curable composition is a photocurable ceramic dispersion. The liquid phase of such a dispersion may be as described above. The solid phase of the dispersion comprises of ceramic particles as mixed in or suspended in the above described polymerizable liquid. Numerous photocurable ceramic resins are known. See, e.g., U.S. Pat. Nos. 6,117,612, 6,932,145 and 8,550,144 and US20100003619. An example of a commercially available composition is Porcelite® as obtainable from Tethon 3D, Omaha, Nebr., USA. The ceramic particles are solid, and may be porous or non-porous, regular or irregular, for example spherical, rod, or fiber-shaped. Any suitable ceramic material can be used, including but not limited to zirconia, alumina, silica and/or yttria. Mixtures of different particles of different ceramic materials and/or shapes, optionally in combination with other materials to facilitate subsequent sintering of the article, may be employed to impart desired characteristics to the desired ceramic product. Examples of such mixtures are described in U.S. Pat. Nos. 6,117,612, 8,500,898, 6,637,500, 5,273,104, 4,837,187 and 4,767,479.

The photocurable ceramic dispersion may comprise of from 20, 30, or 40 percent by volume of ceramic particles and up to 60, 70, or 80 percent by volume of ceramic particles. The photocurable ceramic dispersion may comprise of from 10, 20, 30, or 40 percent by volume of polymerizable liquid and up to 60, 70, 80 or 90 percent by volume of polymerizable liquid. The photocurable ceramic dispersion may comprise of solvents such as water.

The liquid radiation curable composition may also be a photocurable metal dispersion. Such a dispersion may comprise photopolymerizable and/or free radical polymerizable monomers, a suitable initiator and metal particles. The metal particles may be present as nanoparticles. The metal may be any metal Sc, Ti, V, Cr, Mn, Fe, Ni, Cu, Zn, Y, Zr, Nb, Tc, Ru, Mo, Rh, W, Au, Pt, Pd, Ag, Mn, Co, Cd, Hf, Ta, Re, Os, Al, Sn, In, Ga and Ir, preferably Cu, Ni, Ag, Au, Pt, Pd, Al, Fe, Co, Ti, Zn, In, Sn and Ga and even more preferably Cu, Ni and Ag nanoparticles. The metal may be present as such or as a metal precursors selected from the group consisting of metal oxides, metal hydroxides, metal sulfides, metal halides, organometallic compounds, metal salts, metal hydrides, metal-containing minerals and combinations thereof. Examples of suitable photocurable metal dispersions are described in US2015366073 and US2018326480.

When a photocurable ceramic dispersion or photocurable metal dispersion is used it is preferred to sinter the solidified layer in a next step (d) to obtain a sintered ceramic 3D product or sintered metal 3D object. In this sintering step (d) the resin is removed from the layer and a ceramic 3D product or metal 3D product is obtained. The mould may be present when step (d) is performed. The mould will then decompose by carbonisation of the polymer sheet at the elevated temperatures applied in step (d). The mould may also be separated from the solidified layer having the shape of the 3D product.

Step (d) is suitably performed at a temperature of between 1100 and 1700 C. At this temperature the ceramic particles sinter together and the polymer decomposes mainly into gaseous compounds.

Possible 3D products which may be advantageously be made by this process are suitably products which are produced in a relatively high number. This number is preferably higher than when you would use additive manufacturing. The number of products is on the other hand not so high as in a situation where for example injection moulding is applied. This process provides an option to make different, for example ceramic, products in relatively high numbers without having to invest in complex machined moulds. Instead one only has to invest in one master mould to produce multiple moulds in the thermoforming process. The invention is also very beneficial to make products which require longer curing times. In a traditional process this would not be desired because the expensive and complex mould would then only be able to make a limited number of products. In the process according to the invention the time spend in the mould is not precious because the mould itself is not precious.

The invention may also be advantageously be used to make products which would otherwise be prepared by laser cutting from sheets. Such a laser cutting process results in significant waste materials while the process of the present invention does not produce waste in any significant manner. An example of such a product are gaskets made from a polymerizable material such as rubber and polyurethane.

Figure 2:
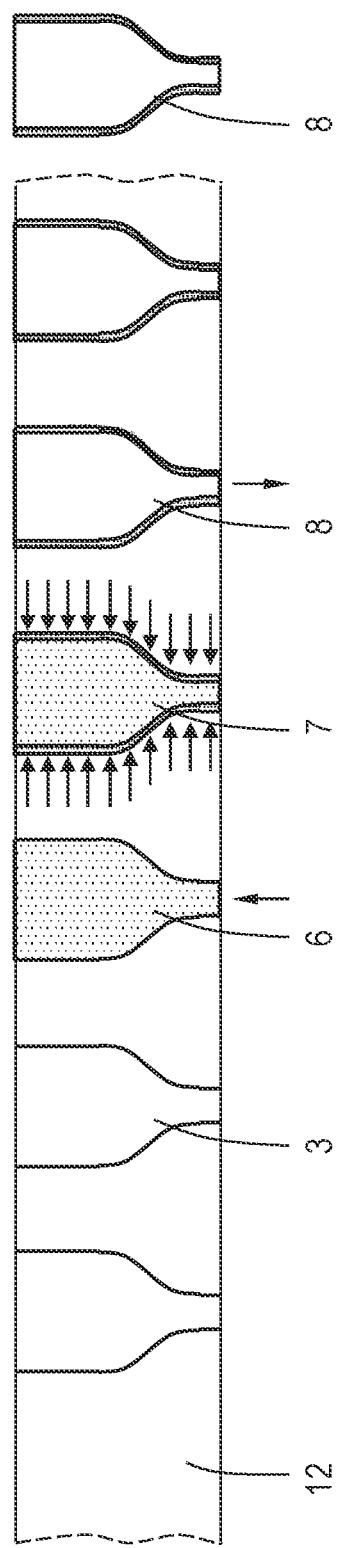

FIG. 1 shows a possible manufacturing line for the process according to this invention as seen from above. From two rolls (1) of plastic sheets (2a,2b), two halves (3a,3b) of a mould (3) are made in two thermoforming stages (4a,4b). The obtained sheet after passing the thermoforming stages (4a,4b) are combined in a sealing station (5). In sealing station (5), the form negative mould of the 3D product are made. In FIG. 2, the moulds are shown from aside. The strips (12a,12b) of connected moulds run from left to right and pass a filing station (6) where a radiation curable composition is added from below into the mould (3). The filled mould (3) then passes a radiation station (7) where the mould is exposed to radiation and a solid layer (8) forms at the interior surface of the mould (3). In a defiling station (9) the excess liquid is removed from the cured mould (3). In a de-moulding station (10) the mould (3) is removed and the obtained 3D product is obtained. Alternatively the mould is not removed and used as packaging. In that case the strip of cured moulds is sent to a cutting station where the separate packaged 3D products are obtained. \

EXAMPLE

A mould was made by sealing two formed sheets of a light transparent polymer. The sheets had a thickness of 100 micron. The sheets were obtained by thermoforming. An opening was provided as a gating opening and a Tethon 3D, photocurable ceramic dispersion was added. The filled mould was irradiated with UV light for 5 minutes. A solidified layer of 2 mm formed on the inner side of the mould. The non-solidified photocurable ceramic dispersion was removed. Subsequently the mould was removed by simply breaking away the sheets from the solidified layer. The thus obtained solidified layer was put in a sintering oven. After cooling a ceramic product having the 3D shape of the mould was obtained.

What is claimed is:
1. Process for producing a radiation cured 3D product comprising the following steps:
(a) providing a form negative mould of the 3D product comprising of one or two formed plastic sheets as obtained by thermoforming corresponding with the shape of the 3D product,

(b) adding a liquid radiation curable composition to the form negative mould such that the inner surface of the form negative mould is covered by the liquid radiation curable composition, and (c) solidifying the liquid radiation curable composition by radiation through the formed plastic sheet of the form negative mould to form a solidified layer or body having the shape of the radiation cured 3D product.

2. Process according to claim 1, wherein the formed plastic sheet is obtained by a continuous thermoforming process using a thermoforming packaging machine.

3. Process according to claim 2, wherein the mould is comprised of two formed plastic sheets or the mould is comprised of one formed plastic sheet and one planar sheet.

4. Process according to claim 3, wherein the thermoforming packaging machine comprises of one or two thermoforming stations and a sealing station and wherein in the thermoforming station a formed intermediate sheet is obtained, wherein in the sealing station this formed intermediate sheet is combined with a planar sheet or with another formed intermediate sheet obtained in the optional second thermoforming station to obtain the form negative mould of the 3D product.

5. Process according to claim 1, wherein in step (b) the mould is filled with the radiation curable composition and wherein in step (c) part of the radiation curable composition is solidified as the solidified layer and wherein after solidification of the radiation curable composition any non-solidified radiation curable composition is removed from the mould.

6. Process according to claim 1, wherein the radiation in step (c) is microwave radiation resulting in that the liquid radiation curable composition cures due to dielectric heating.

7. Process according to claim 1, wherein the liquid radiation curable composition is a photocurable ceramic dispersion.

8. Process according to claim 7, wherein in a step (d) the solidified layer or body is sintered thereby obtaining a sintered ceramic 3D product.

9. Process according to claim 8, wherein prior to step (d) the form negative mould is separated from the solidified layer or body having the shape of the 3D product.

10. Process according to claim 1, wherein the plastic is a thermoplastic polymer.

11. Process according to claim 10, wherein the plastic is polystyrene.

12. Process for producing a radiation cured sintered ceramic 3D product comprising the following steps:

(a) providing a form negative mould of the 3D product comprising of one or two formed plastic sheets as obtained by thermoforming corresponding with the shape of the 3D product, (b) adding a liquid photocurable ceramic dispersion to the form negative mould such that the inner surface of the form negative mould is covered by the liquid photocurable ceramic dispersion, (c) solidifying the liquid photocurable ceramic dispersion by radiation through the plastic sheet of the form negative mould to form a solidified layer or body, and (d) sintering the solidified layer or body and thereby obtaining a radiation cured sintered ceramic 3D product, wherein the formed plastic sheet is obtained by a continuous thermoforming process using a thermoforming packaging machine.

* * * * *